Feb. 2, 1932.   H. A. W. WOOD   1,843,469
WEB CHANGE DEVICE
Original Filed July 7, 1925   10 Sheets-Sheet 1
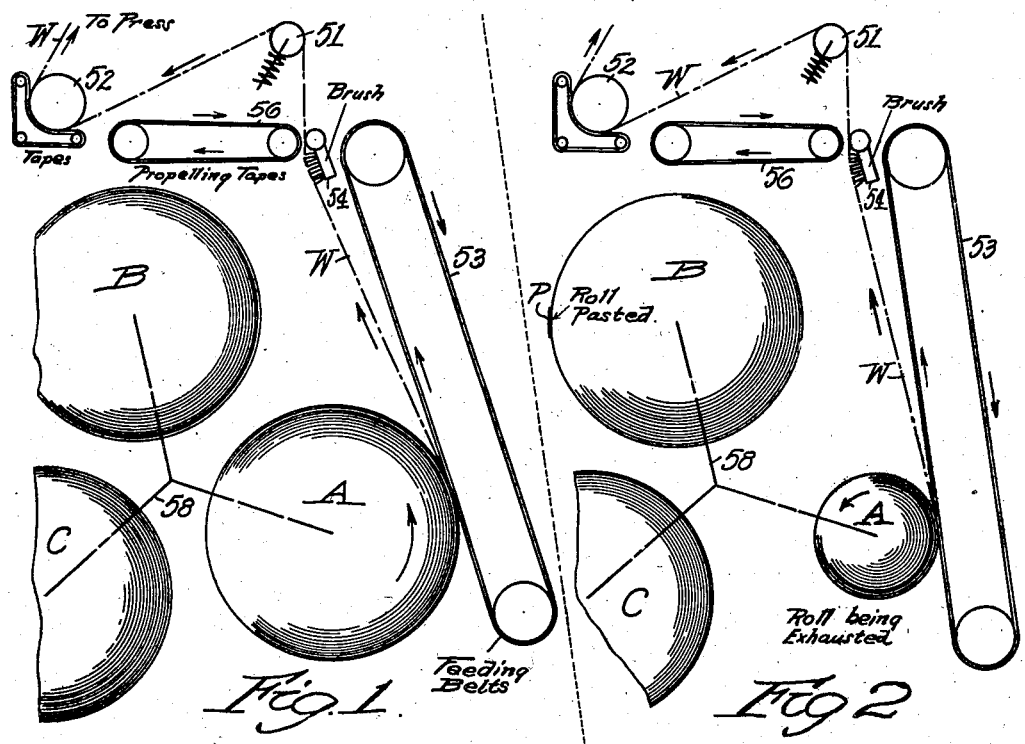
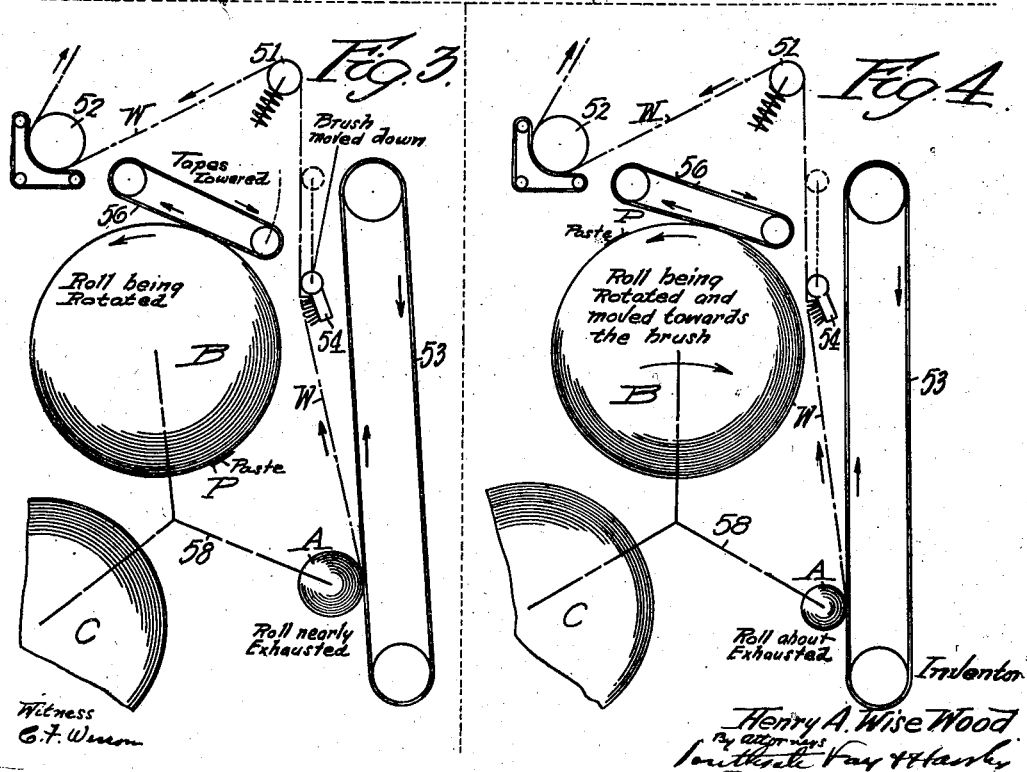

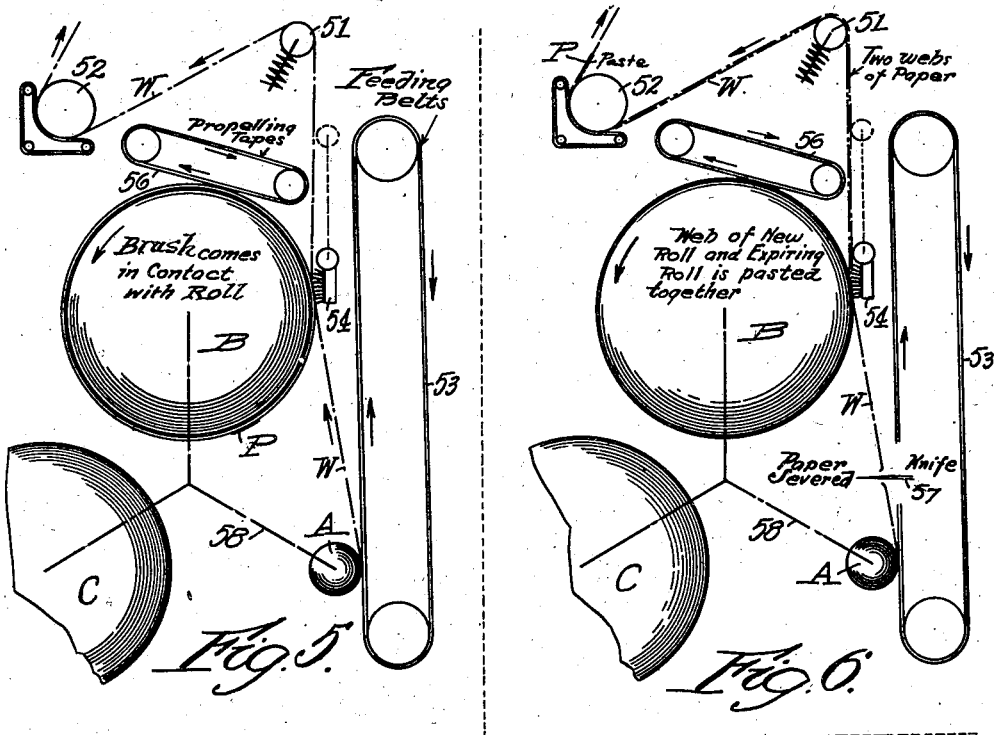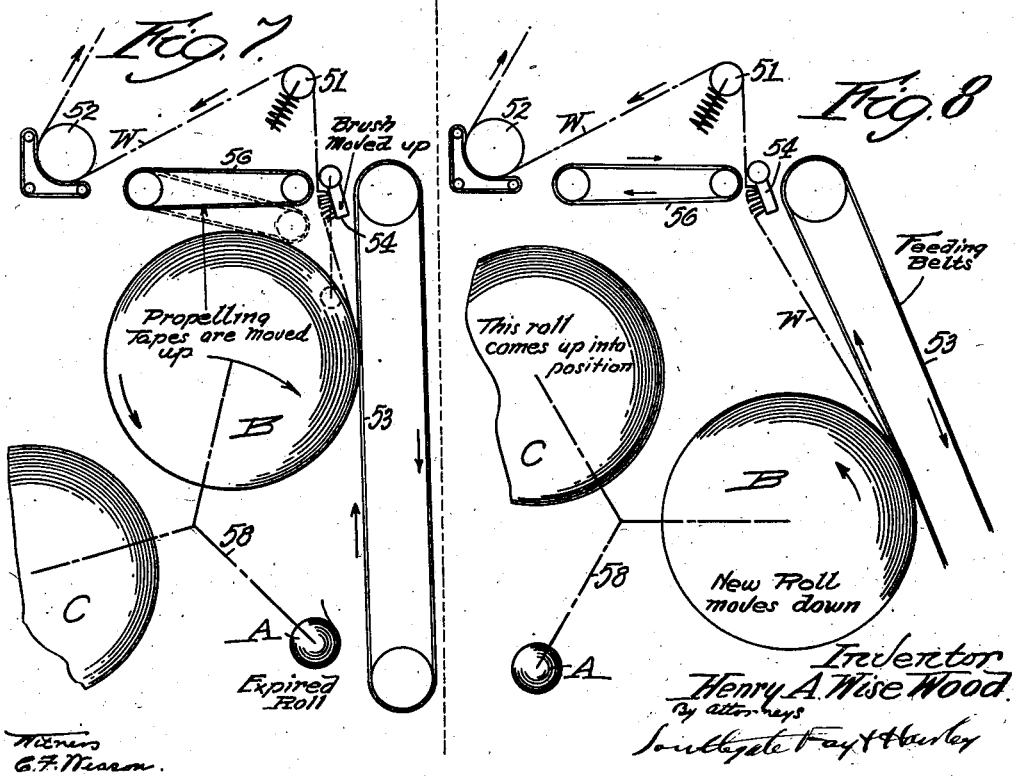

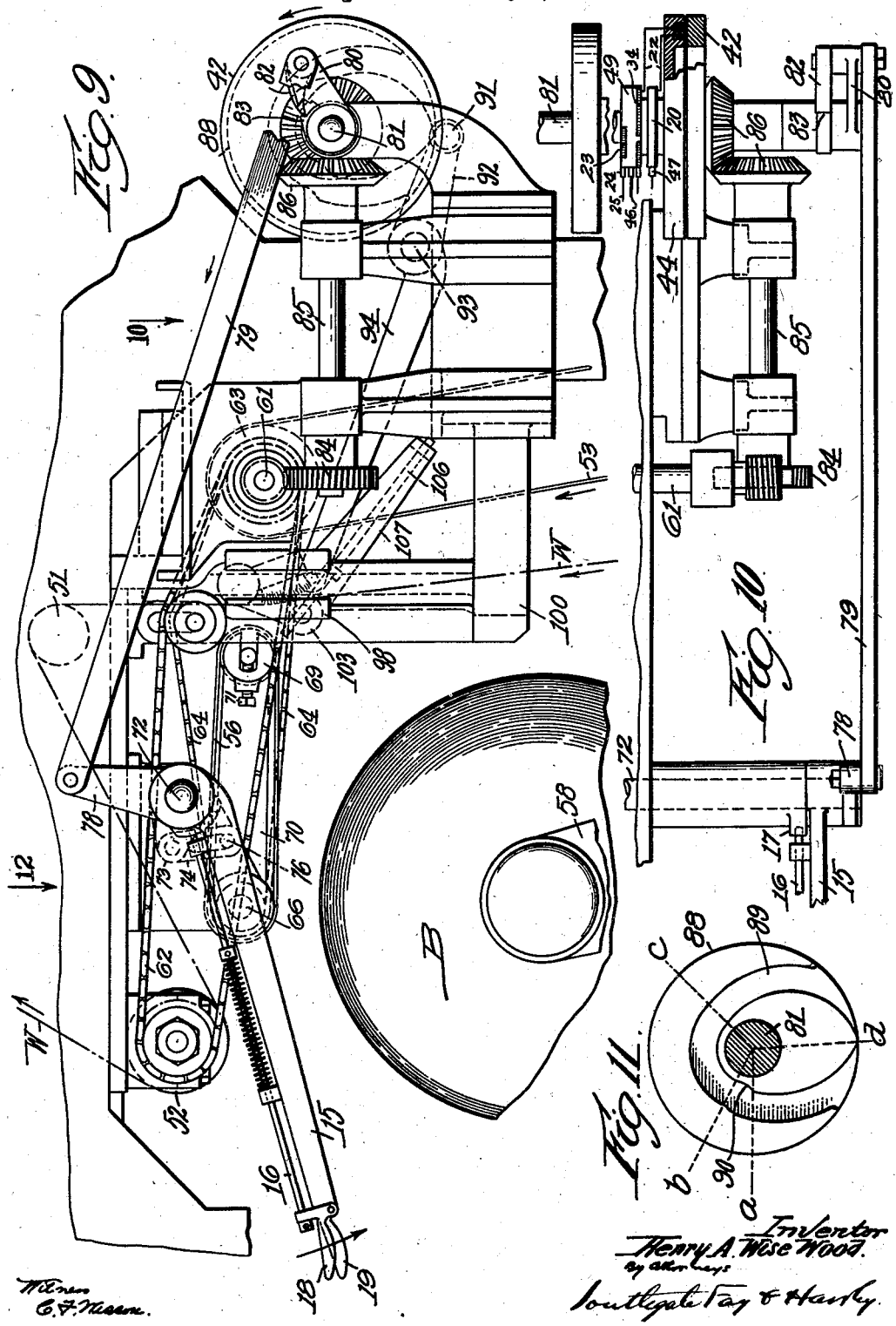

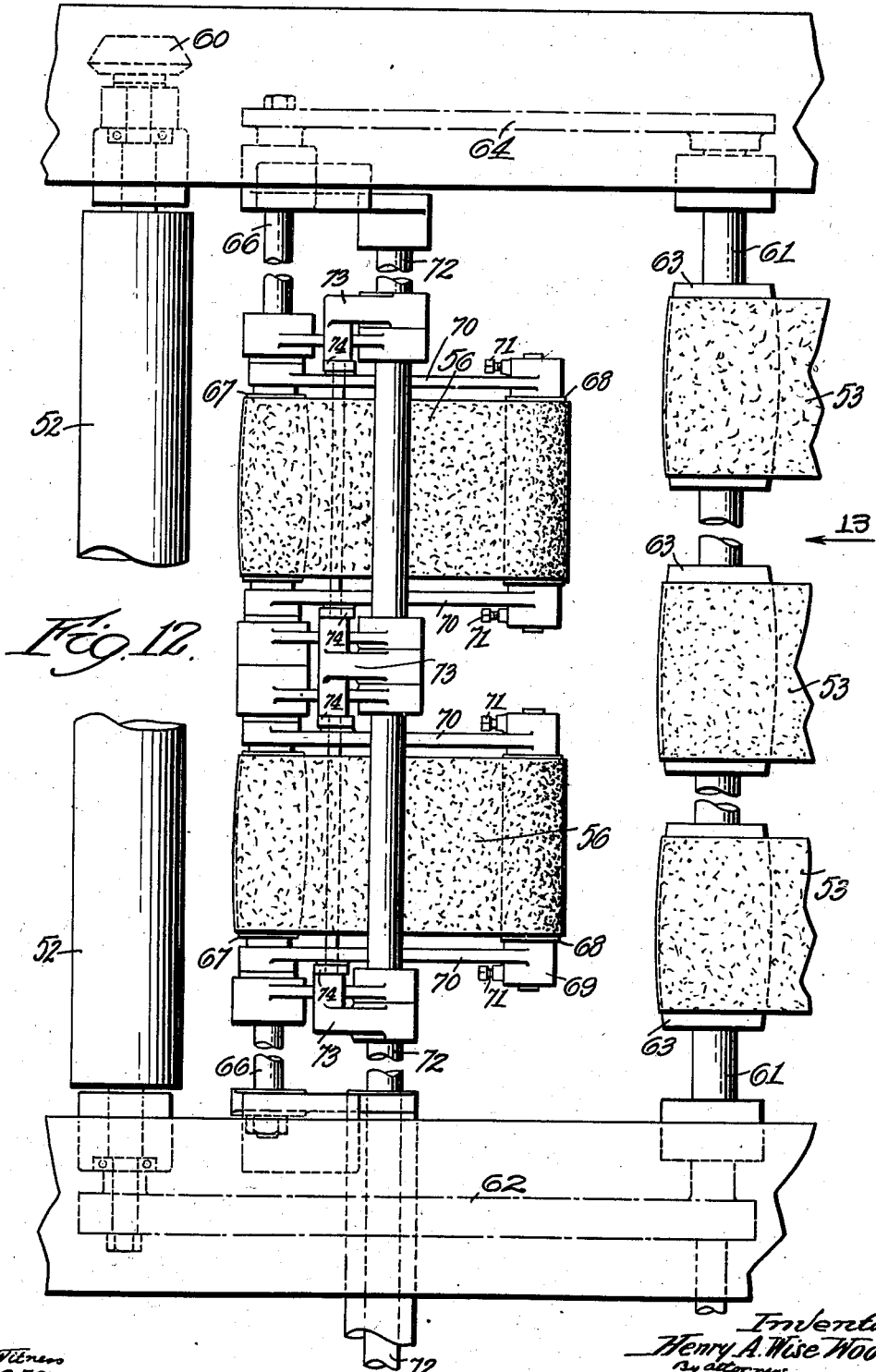

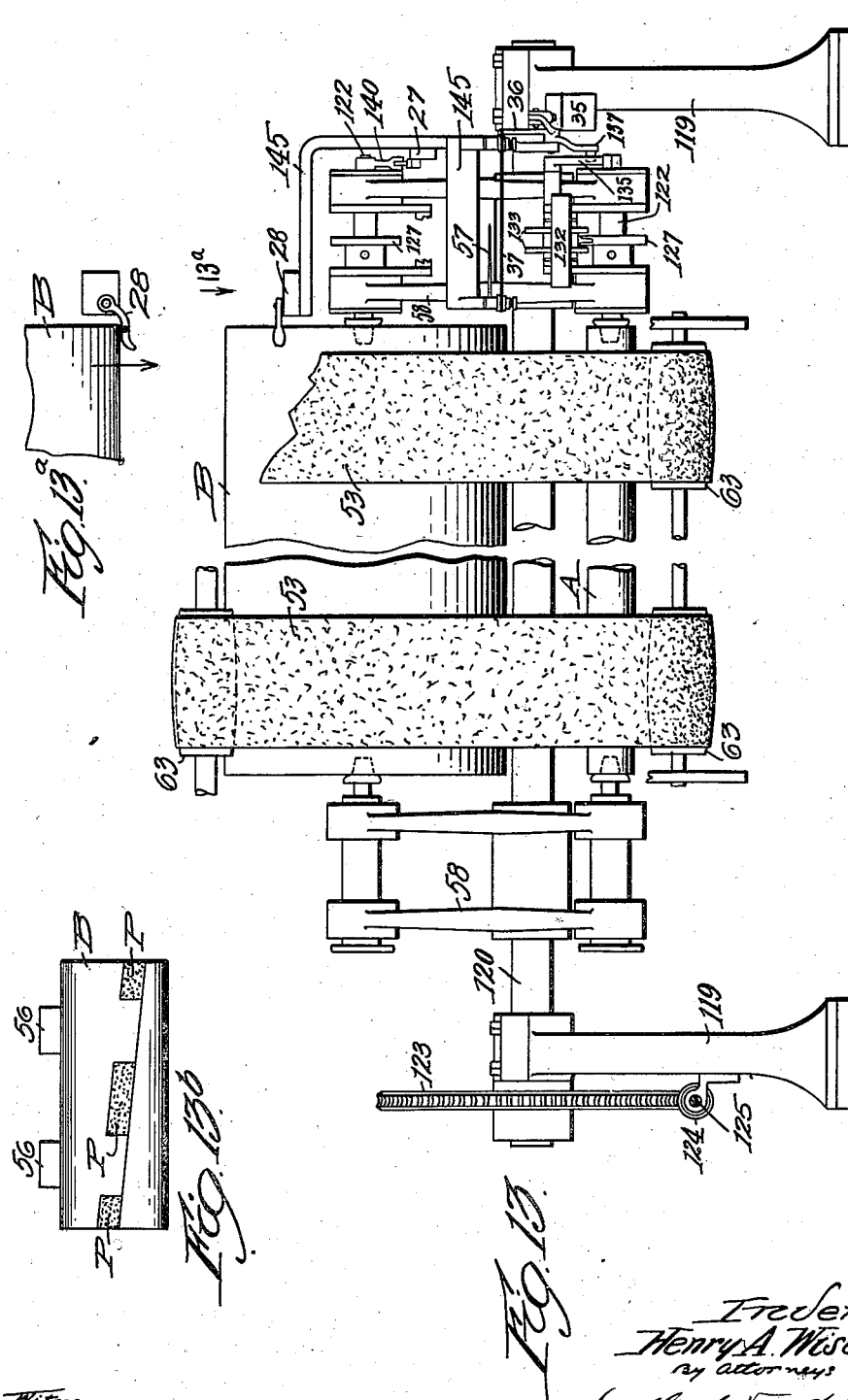

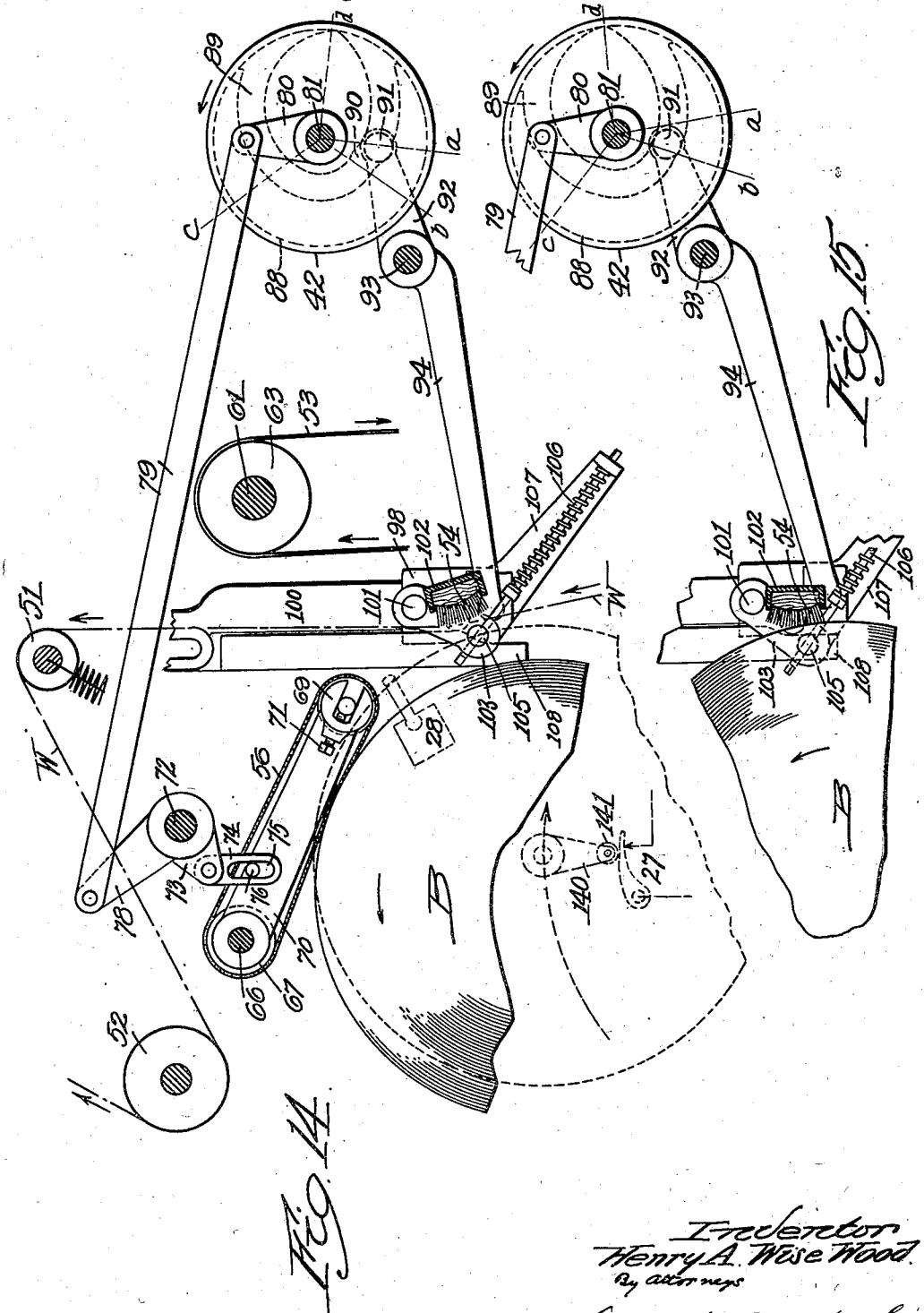

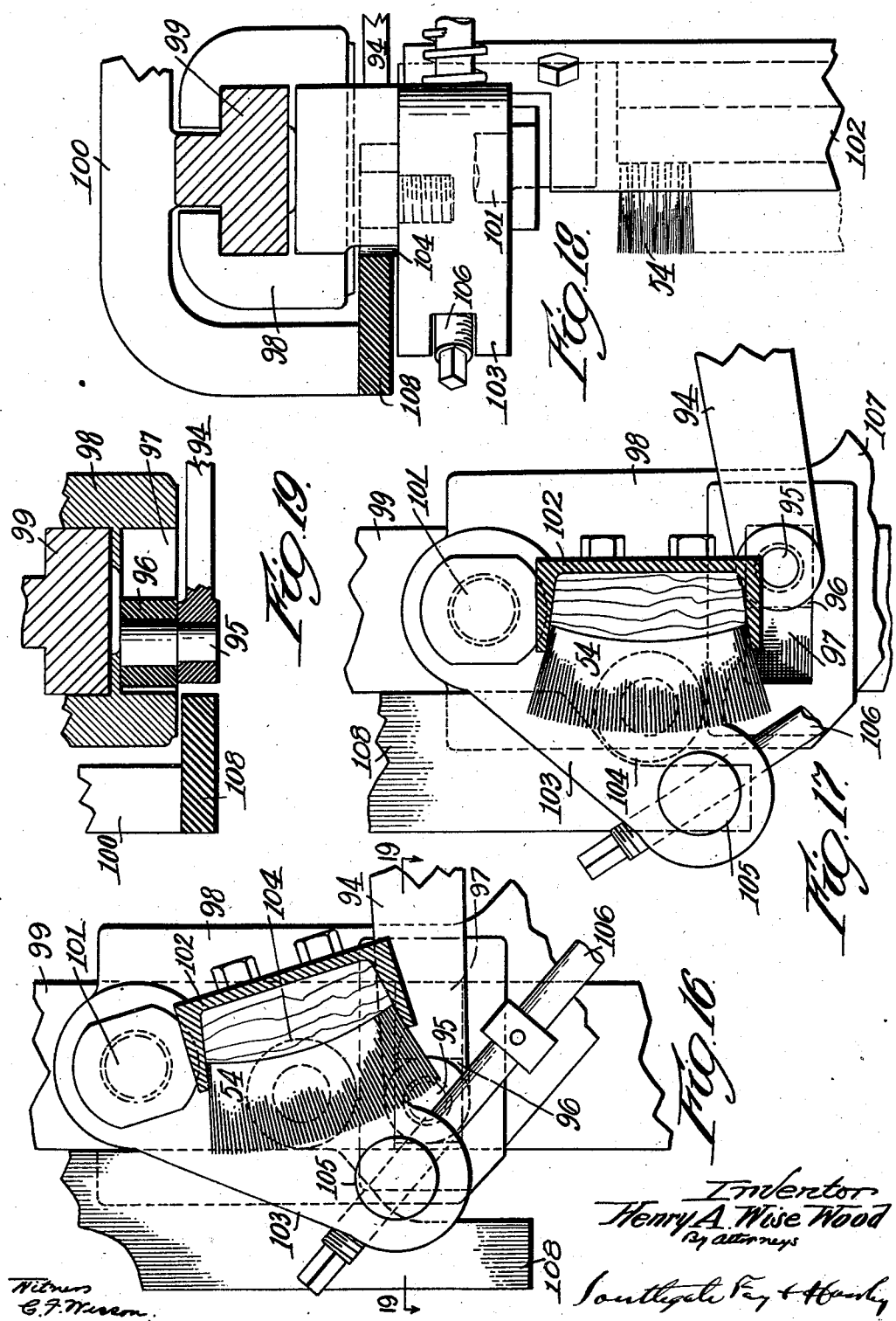

Feb. 2, 1932. H. A. W. WOOD 1,843,469
WEB CHANGE DEVICE
Original Filed July 7, 1925 10 Sheets-Sheet 8
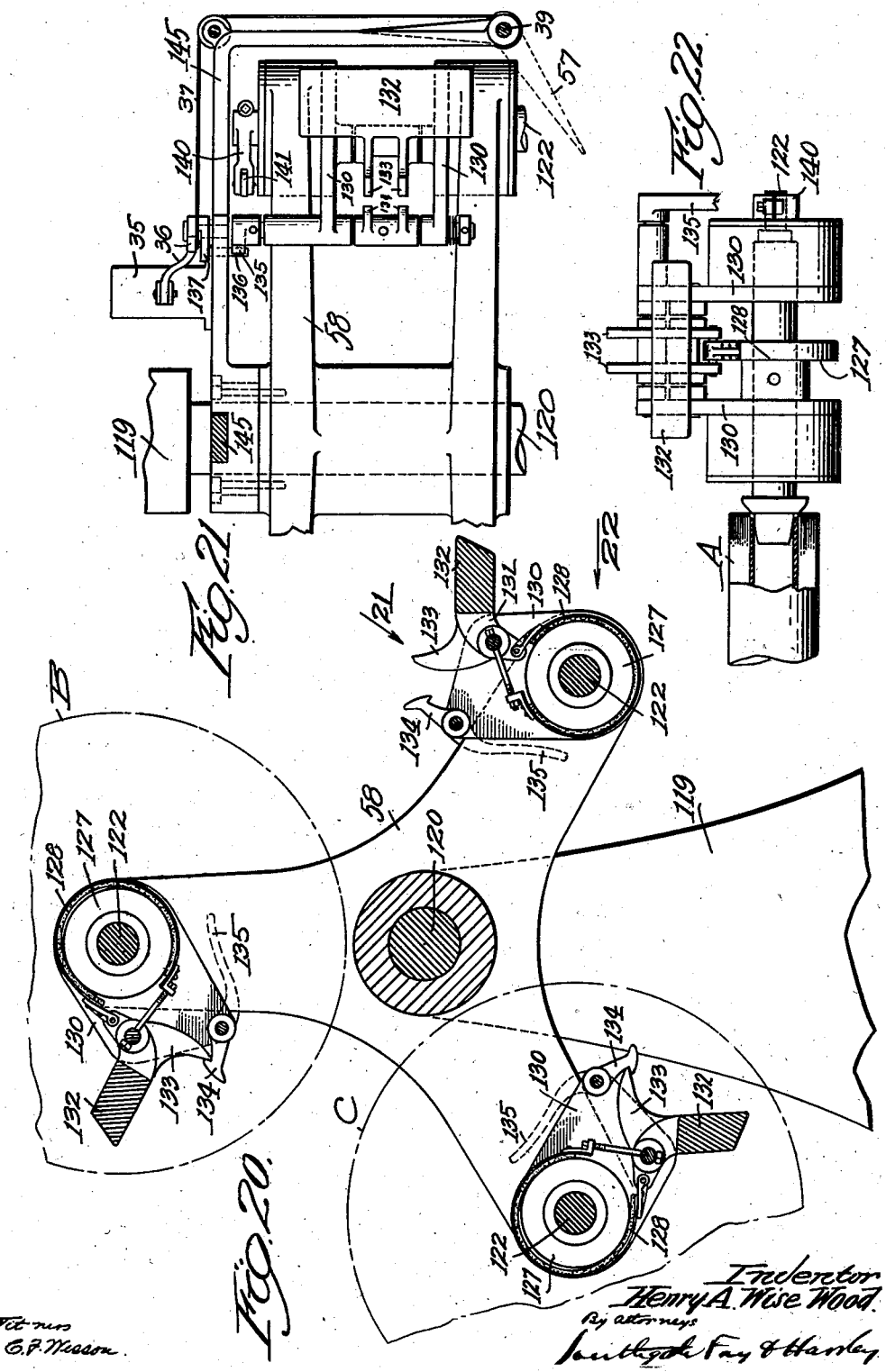

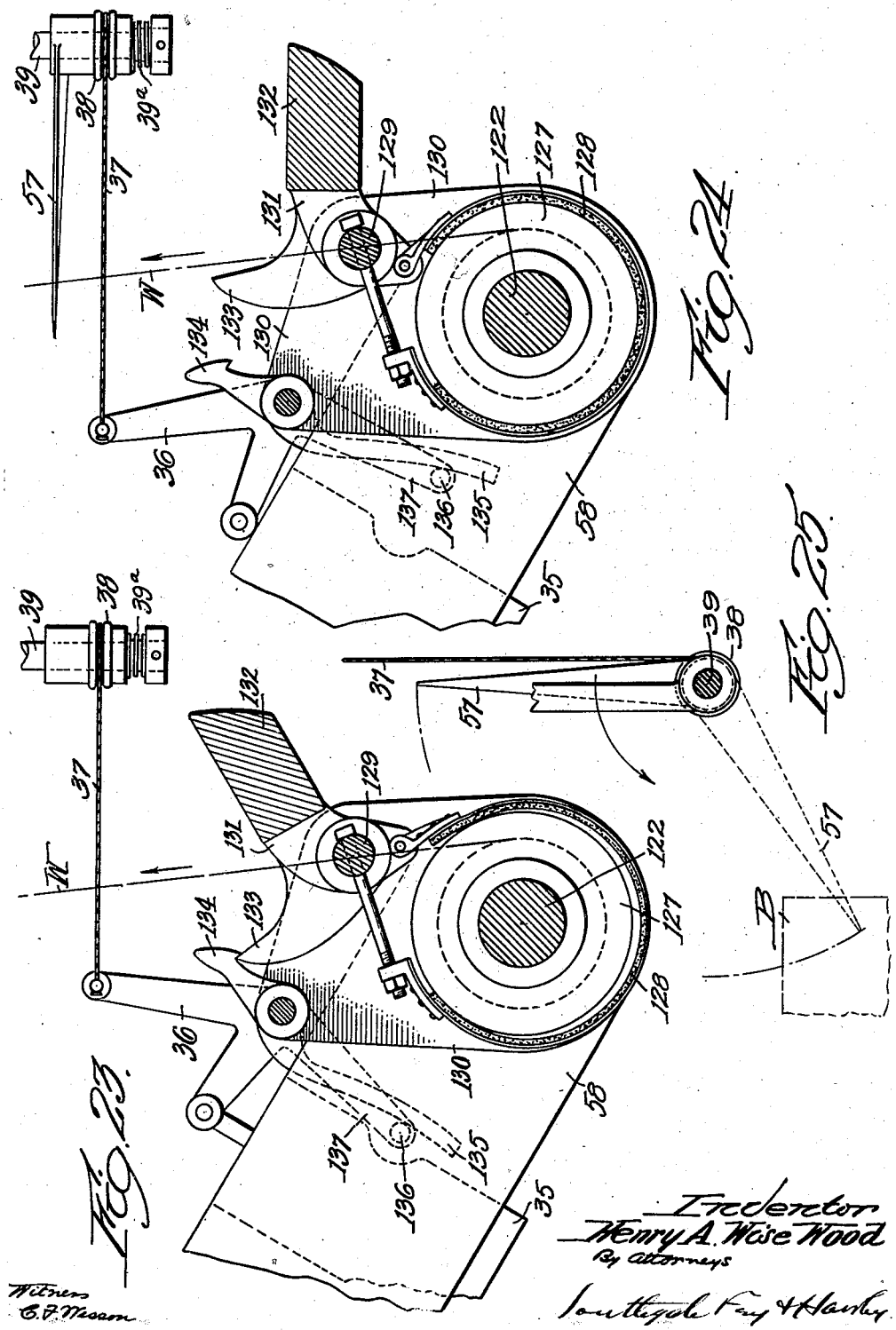

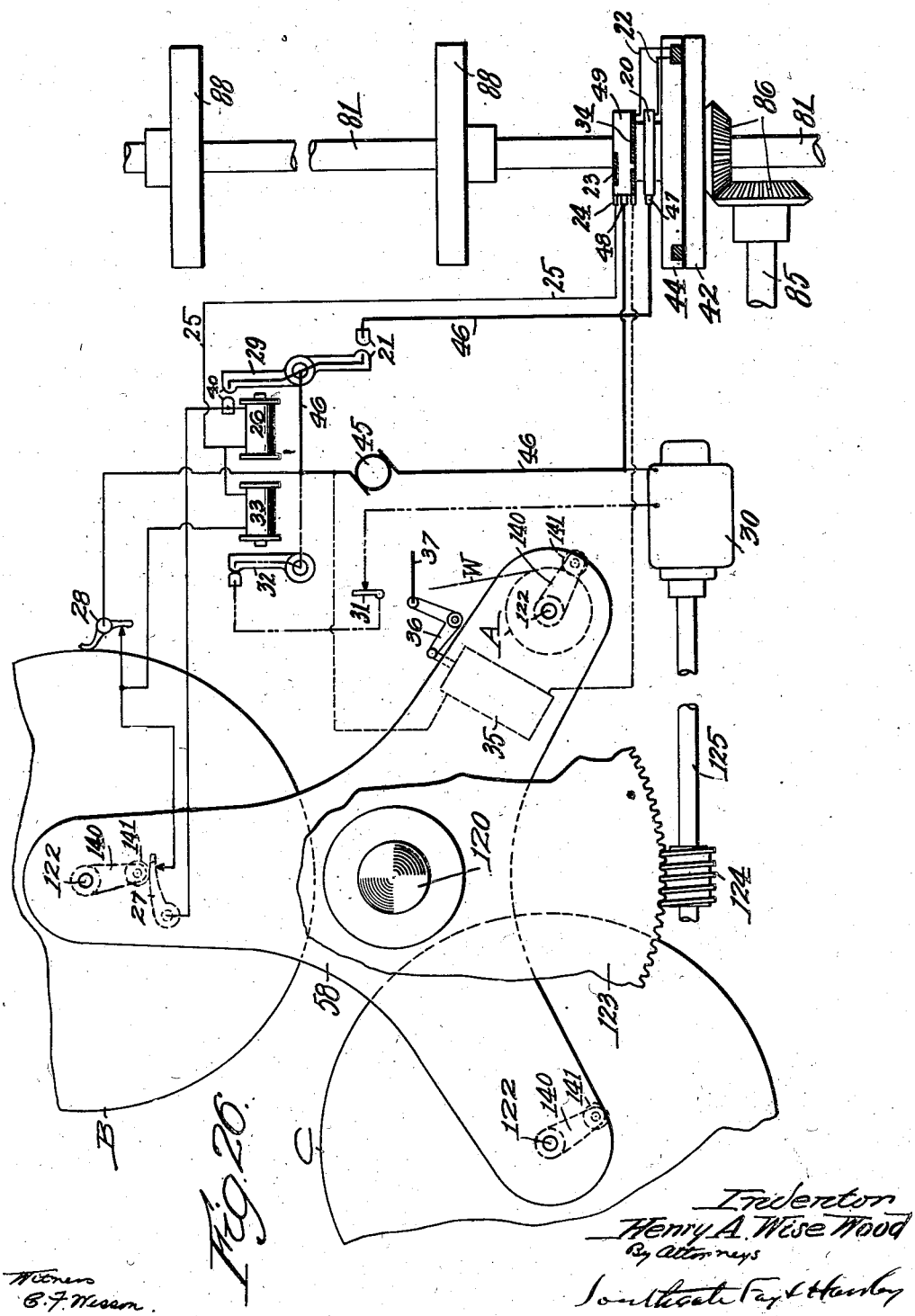

Patented Feb. 2, 1932

1,843,469

UNITED STATES PATENT OFFICE

HENRY A. WISE WOOD, OF NEW YORK, N. Y., ASSIGNOR TO WOOD NEWSPAPER MACHINERY CORPORATION, OF NEW YORK, N. Y., A CORPORATION OF VIRGINIA

WEB CHANGE DEVICE

Application filed July 7, 1925, Serial No. 42,061. Renewed October 2, 1928.

This invention relates to the attachment of the leading end of the web of a new web roll to the expiring end of the web of a nearly exhausted roll so as to feed a web to a printing press continuously without stopping the operation of the latter, and without slowing it up while the webs are being connected.

The principal objects of the invention are to locate the fresh and running rolls in such position with respect to the path of the web that the web will move closer and closer to the fresh or spare roll merely by the change of the web path due to the decrease in size of the running roll; to provide for setting the roll propelling means for the new web roll at the proper time by hand into contact with the new roll and at the same time bringing a device for deflecting the running web out of its normal path into a position adjacent to the new web roll ready for action; to provide means whereby these two functions will be performed by the operation of the same lever or other starting device; to provide means whereby the movement of the new web roll in its circular path will bring it into contact with the running web as deflected by said deflecting device so that the next time the pasted portion thereon moves around into contact with the new web it will be pasted thereto; to provide means for automatically puncturing the paper of the old web, and applying a brake to the old or running roll spindle so as to sever the web by these two operations, and for automatically stopping the rotation of the reel carrying the several web rolls including the expired stub and the new roll when the latter gets to its running position. The invention also involves improvements in the means for accomplishing these several results, including the operating handle and connected mechanism for lowering the roll propelling tapes into contact with the fresh web roll to start it into rotation and bringing the web deflecting device into a position adjacent thereto; means in position to be engaged by the new web roll when it moves up to pasting or splicing position for stopping at the proper time the rotation of the reel on which the said web roll is mounted, applying the brake to the expiring roll, actuating the puncturing device which starts the separation of the old web from its stud, and connecting up the other operating mechanism with the driving shaft and disconnecting the same therefrom. Other objects and advantages of the invention will appear hereinafter.

Reference is to be had to the accompanying drawings, in which

Fig. 1 is a diagrammatic end view of a web change device operating in accordance with this invention and indicating the positions of the three web rolls, the running roll, the new roll, and the third roll, and showing them and also other essential parts in the running position;

Fig. 2 is a similar view showing the running roll partially exhausted and the rest of the parts in the same position;

Fig. 3 is a similar view showing the running roll nearly exhausted, the propelling tapes lowered into contact with the fresh roll, and the deflecting device also lowered to divert the running web from its normal path;

Fig. 4 is a similar view showing the next position of the parts in which the running roll is practically exhausted and the rotation of the reel is bringing the fresh roll around nearly into position for the pasting or splicing action;

Fig. 5 shows the fresh roll actually brought into contact with the web, already deflected out of its path;

Fig. 6 shows the splicing and the old web being severed from the exhausted roll, the other parts having remained in the same position;

Fig. 7 shows the next position of the parts in which the deflecting brush and the propelling tapes have been moved up into normal running position, and the exhausted roll has been moved along by the rotation of the reel out of contact with the feeding belts and ready to be taken off the reel;

Fig. 8 shows the position when the roll, which has been called the "fresh web roll", has moved into running position and the reel is just ready to be stopped in the position shown in Fig. 1;

Fig. 9 is a detail view taken from the same side of the device showing the mechanism for operating the propelling tapes and the web deflector in the position shown in Fig. 1;

Fig. 10 is a plan of the connections for operating the cam shaft which controls the operation of the web deflecting device;

Fig. 11 is a detail view of the cam for performing that operation;

Fig. 12 is a plan of the propelling tapes and feeding belts and their operating connections;

Fig. 13 is a side view of this mechanism showing the feeding belts in front as indicated by the arrow 13 in Fig. 12;

Fig. 13ª is a plan indicating the operation of the electrical controlling mechanism by the movement of the fresh web roll;

Fig. 13ᵇ is a plan of the fresh web roll showing the paste spots thereon;

Fig. 14 is a side view on enlarged scale partly in section with the parts shown in position illustrated in Fig. 3;

Fig. 15 is a similar view showing the parts in the position shown in Fig. 5;

Fig. 16 is a still further enlarged view partly in section of the web deflecting device and its connected parts shown in position illustrated in Figs. 3 and 14;

Fig. 17 is a similar view showing the position illustrated in Figs. 5 and 15;

Fig. 18 is a plan of these parts partly in section;

Fig. 19 is a sectional view of the same on the line 19—19 in Fig. 16;

Fig. 20 is an end view of the roll carrying reel with certain parts in section showing the brake latch mechanism and the parts in the position shown in Fig. 5;

Fig. 21 is a plan of the one arm of the reel taken at a slight angle as indicated by the arrow 21 in Fig. 20;

Fig. 22 is a side view of one of the brakes as indicated by the arrow 22 in Fig. 20;

Fig. 23 is an enlarged detail view of the brake and latch mechanism and severing means in a position just before the roll reaches the position shown in Fig. 20 at the right, that is, before the latch is released;

Fig. 24 is a similar view showing the position illustrated in Fig. 20 at the right;

Fig. 25 is a fragmentary view illustrating the severing operation; and

Fig. 26 is an end view of the reel and its operating mechanism, showing also the cam shaft in plan, and illustrating diagrammatically the electrical connections for controlling various parts.

For the purpose of indicating the general action of the machine before describing the mechanism and the operation in detail I will describe the first eight figures further.

It will be understood that the running web roll A, the fresh web roll B which are both on the same side of the web W, and the third web roll C which is to become the next fresh roll, are mounted on a reel 58 which turns about a central shaft 120 as will appear. The fresh web roll A in Fig. 1 is delivering the web W to the press past the roll B over a spring-pressed idle guide roll 51 and a web control roll 52 operated positively from the press. The web is propelled by a series of feeding belts 53. The web travels uniformly and passes into contact with a brush 54 or, as I have called it, a "deflecting device". This figure shows the normal path of this web during the run, the brush constituting merely a guide for it at this time. In this figure also are shown the propelling means in the form of tapes 56 for rotating the fresh web roll B on its own axis.

In Fig. 2 nothing is changed except that the paste-spots P have been applied to the roll B and the running roll A is becoming exhausted.

In Fig. 3 the web has approached toward the fresh roll by reason solely of the decrease in size of the running roll A. Now the fresh roll propelling tapes 56 are lowered into contact with the fresh roll to start it into rotation, and the brush 54 is moved down so that it deflects the web out of its normal path and brings its deflected point nearest the fresh web roll, except for a slight change which will be mentioned later. It is to be noted that where the web is deflected from a straight path at this point it is at a point located about where it would come into tangency to the fresh web roll.

Now in Fig. 4 the running roll is almost exhausted and ready for the operation, the fresh roll now rotating in the direction of the arrow at web speed. It is to be noted too that the reel is carrying this fresh web roll over toward the brush 54 and taking the exhausted roll down along the feeding belts 53 but it is still under their control.

In Fig. 5 the roll B has not moved substantially but the brush 54 has been shifted on a pivot toward the fresh web roll, so as to bring the running web into contact with the roll B. In Fig. 6 the spots of paste P have rotated around into contact with the old web and the web is spliced. A double web is therefore shown for a short distance along the course of the running web. Furthermore, a knife 57 has been brought against the web near one edge and started its separation from the stub. Although not indicated on this figure, a brake is applied to this stub at this time to assist in the severing operation.

Now Fig. 7 shows the first step in the recovery of the parts to their original position. The tapes 56 are brought up from the dotted to the full line position, the brush 54 is swung back slightly about its pivot and also raised to its original position. Also the reel has moved to bring the fresh roll B over into contact with the belts 53 and the exhausted stub A out of contact with them.

Fig. 8 merely shows the position of the parts when the reel has moved around far enough so that the new roll B is now in the position which the original running roll A previously occupied or nearly so, and the last mounted roll C is moving up into a position for its web to be spliced to the exhausted web at the proper time. Now the reel continues to rotate by power until the parts are back in position as shown in Fig. 1 and then the power is automatically cut off from the reel to leave it in that position while the running roll which, it is to be noticed is marked A and not B in that figure, supplies its web to the press.

It will be understood that a good deal of the mechanism above described is connected with and operated by the press. For example, a bevel gear 60 (Fig. 12) on the shaft of the web control roll 52 is connected with the main part of the press and operated continuously at such a rate that its surface rotates at web speed. The other end of the shaft is provided with a sprocket wheel which drives a chain 62 connected with a sprocket wheel on a shaft 61 for driving the latter. On this shaft 61 are pulleys 63 on which are the feeding belts 53. The shaft 61 also, by means of sprocket wheel, drives another chain 64 driving a sprocket wheel on a shaft 66. On this shaft are two pulleys 67 which drive the fresh roll propelling tapes 56. These propelling tapes also pass over a pair of rolls 68 mounted to freely rotate on a shaft mounted in slots in hubs 69 on arms 70. The arms are pivoted on the shaft 66 and swing about the same in the manner described above. The rolls 68 are adjustable by means of adjusting screws 71 to vary the tension on the propelling tapes.

Carried by the frame of the machine is a cross shaft 72. This is provided with a series of arms 73 which carry depending links 74 having elongated slots 75. These slots receive rods 76 on the arms 70. Therefore when in the position shown in Fig. 9, they hold these arms up so that the propelling tapes are out of the way as in Figs. 1 and 2. When in the position shown in Fig. 14 they let them down and enable the propelling tapes to contact with the new web roll B (see Fig. 3).

Also fixed on the shaft 72 is an arm 78 connected by a link 79 with an arm 80 pivoted on a cam shaft 81. This arm 80 has a pawl 82 thereon for co-operating with a tooth 83 projecting from a disc fixed to the shaft 81 to turn the shaft through a small arc when the feeding tapes are lowered. On the shaft 72 there is pivoted an operating handle 15 having a spring-pressed rod 16, the end of which is adapted to engage in either one of two notches in a disc 17 fixed on the shaft 72. This spring-pressed rod 16 is operated by handle grip 18 in connection with the grip 19 on the handle 15 so that the shaft 72 can be turned and with it the propelling tapes raised or lowered and the pawl 82 operated for the purpose of turning the shaft 81 slightly by hand when these belts are operated.

The shaft 61 is provided with a worm operating a worm wheel 84 on a shaft 85 and therefore through bevel gears 86 constantly drive a friction clutch section 42 loose on the cam shaft 81.

On this shaft 81 are two cams 88 each having a groove 89 provided with a depression 90. In this cam groove operates a roller 91 on an arm 92 fixed on a shaft 93 and having an arm 94 projecting therefrom at each end. On each arm 94 is a stud 95 carrying a block 96 which is located in a slot 97 on a slide 98. This slide has a pair of guiding surfaces which receive between them a vertical guide 99 on a stationary bracket 100 on the frame. Therefore the oscillation of the arm 94 causes the slide 98 to move up and down on this guide.

The slide carries a pivot stud 101 which has fastened to it and swinging with it an angle iron frame 102 which carries the brush 54 previously referred to. Also fixed with respect to the stud 101 is an arm 103 which carries a cam roller 104. On this swinging arm 103 is a poppet 105 carrying an adjustable spring pressed rod 106, the opposite end of which is carried by a projecting arm 107 on the slide 98. This spring pressed rod 106 presses the swinging arm forwardly and holds the roller 104 against a stationary cam 108 on the fixed bracket 100. It will be seen therefore that the angular position of the brush 54 depends on the elevation of the slide 98 with relation to the cam 108.

The section 42 of the clutch on the shaft 81 turns freely thereon. The magnetic field 44 of the clutch is keyed to the cam shaft 81. When current from any suitable source is carried through the magnetic field of this clutch, the two clutch parts 42 and 44 will be engaged and the cam shaft 81 will rotate part way around. On account of the electrical means illustrated, the circuit for the magnetic clutch and other electrical features can be supplied by a generator 45 or any other source of power. From the source of power a line marked 46 passes to two brushes 47 and 48. The latter is mounted to engage constantly a metallic collector ring 49 and the other a metallic ring 20. These rings are mounted on the shaft 81 but insulated from each other. It will be seen, therefore, that when this circuit is closed by the engaging of two contacts 21 the circuit will be completed to these two rings, and supply current through a pair of wires 22 to the magnetic elements in the clutch and cause the shaft 81 to rotate from the driving shaft 85. The collector ring 49 has a projecting insulated element 23 which, after the cam shaft is rotated a slight distance, will disconnect the collecting ring from a brush 24 connected with a wire 25. When the projection 23 allows the spring-pressed brush 24 to engage the metallic surface of the collector ring 49 it establishes a circuit through this wire 25 and the collecting ring, from the dynamo or the like 45, to a circuit breaker 26 through a switch 27 which we will suppose to be closed at the present time, and a switch 28 back to the dynamo. When these switches are both closed, the circuit breaker 26 will act on a lever 29 to close the main circuit 46 at 21, and thereby operate the shaft 81 by power. The lever 29 also closes contacts 40 to short circuit both switches 27 and 28. When the cam shaft 81 has completed a certain angle of rotation the brush 24 rides up on the surface 23 which is insulated from the rest of the collector ring, thereby releasing the lever 29 and breaking the main circuit 46 at the point 21. This stops the cam shaft.

On Fig. 26 I have shown all the electrical connections. It will be noticed that here is a driving motor 30 connected with the dynamo 45 and the line 46 by a circuit represented by a dot-and-dash line which is broken at two points by hand switch 31 and magnetically operated switch 32. A circuit breaker 33 operates the latter at certain times upon the closing of the switch 28. When this switch closes the circuit breaker is energized and the circuit to the motor is interrupted automatically.

I have also shown a dotted line circuit connected with a region on the collector 49, which region is interrupted by insulating sections 34 separated from each other so that once during each rotation of the cam shaft the circuit from the line 46 is connected through the space between these insulating sections and the dotted line circuit to a solenoid 35 and back to the line 46. This operates the cutter 57 through a lever or bell-crank 36, pivoted on a center on a frame 119 of the reel 58 which supports the rolls A, B and C. One arm of this bell-crank is connected by cable 37 with a roll 38 on a shaft 39 on which the cutter 57 is located. A spring 39ᵃ on this shaft 39 holds the cutter back against the action of the cable 37 which is pulled out by the solenoid to swing the cutter as shown in Fig. 25.

On the reel frame 119 is located a shaft 120 which carries the reel 58. This reel comprises three sets of arms which support the studs 122 of the three web rolls A, B and C. On the shaft 120 is a gear 123 operated by a worm 124 on a shaft 125 driven by the motor 30 for the purpose of rotating the reel 58.

Each of the sets of arms for supporting a roll is provided at one end of the reel with a brake disc 127 fixed on the web roll stud 122 which is supported by the arm. There is a brake-band 128 for each disc. Each brake-band is connected at one end through a poppet 129 adjustably with a plate 130 which is fixed to the arm of the reel. The other end of each brake-band is pivotally connected with a lever 131 which has a weight 132. The weight operates at certain times to pull the lever around and tighten the brake-band as appears in Fig. 24. This lever 131 is provided with two hooks 133 adapted to be engaged by a double latch 134 pivoted on the plate 130. This latch 134 has a projecting end 135 adapted to be engaged by a roll 136 on a third arm 137 on the lever or bell-crank 36 for the purpose of releasing the lever 131 from the position shown in Fig. 23 and allowing the weight 132 to move over into the position to apply the brake as shown in Fig. 24. This occurs when the solenoid acts to operate the knife 57. It will be noticed that there is one of these on each of the three arms of the reel, although there is only one solenoid. The action just described is arranged to take place when the center on which the latch 134 turns, comes around to register with the center on which the lever 36 turns.

On each of the web roll studs at one end is an arm 140 having a roller 141. It is this roller that engages the switch 27 and closes it when the reel moves around to the position shown in Fig. 26. This occurs after the surface of the web roll B itself engages the arm of the switch 28 to close that. A stationary bracket 145 is provided for supporting the switches 27 and 28 and the cutter shaft 39.

*Operation*

Starting with the parts in the position shown in Fig. 1 it will, of course be understood that the fresh roll propelling tapes and the web feeding belts are being operated continuously, although the former are lifted up out of the way and perform no function. The web, of course, is running from the running roll A to the guide roll 51 past the fresh roll B and into the press, the reel is not rotating nor the roll B. The cam shaft 81 also is not rotating.

Now as the web runs and the running roll grows smaller, the web gradually approaches the fresh roll. When the running roll A gets quite small, as shown in Figs. 2 and 3, the operator first pastes the spots P on the roll B and then he lowers the handle 15 so as to lock it in its lowermost position. This lowers the propelling tapes on the new roll B.

When the operating handle 15 is lowered as stated, it not only operates the propelling tapes 56 but it moves the link 79 forward so that the pawl 82 will engage the tooth 83 and turn the crank shaft a short distance from the position shown in Fig. 9 to that shown in Fig. 14, so that the brush 24 will move off the insulated element 23 and rest against the collector ring 49. This rotates the cams 88 from the line $d$ to the line $a$ in Fig. 11. These cams thus act to cause the mechanism carrying the brush to lower the latter along its opposite guides from the position shown in Fig. 9 to that shown in Fig. 14. This is accomplished by the weight of the slides 98 and brush and the shape of the cam grooves. These slides 98, one on each side of the machine, move down at first without changing the angular position of the brush. The rollers 104 on the arms 103 rest on the high part of the cams 108, thereby keeping the brush drawn back as shown in Figs. 4 and 16. This is as far as the shaft is turned by the handle 15, and is indicated by the line $a$ in Fig. 11, that is, the rollers 91 are in that part of the cam grooves 89 and have not yet dropped into the recesses or depressions 90. The operator also closes the hand switch 31. As the switch 32 is closed by a spring, the motor 30 will be started and the reel will commence to rotate to carry the three rolls around slowly. The progress of the rolls before the next operation is indicated by the difference in their positions in Figs. 2 and 4. When the new web roll B comes up to the latter position its surface engages the switch lever 28 and closes that switch which completes a circuit through the circuit breaker 33, as previously described. This throws out the switch 32 and stops the motor.

The roll B, it must be remembered, is rotating on its own axis and when the arm 140 on its stud has rotated around to the position shown in Fig. 26, at which time the paste spot P is practically in pasting position, the switch 27 will be closed by the roller 141. Now a circuit is completed through this switch and through the circuit breaker 26 which forms a contact at 21 and completes the circuit 46 so as to start the cam shaft 81 by power. The contacts 40 are also closed at that same time and the two switches 27 and 28 thus cut out or short-circuited so that the further rotation of the arm 140 will not affect these conditions.

The rotation of the cam shaft 81 by connection of the clutch sections 42 and 44 through the establishment of the circuit 46 has for its first effect the bringing of the cam roll 91 into the depression 90 in the cam, passing from the line $a$ to the line $b$ in Fig. 11. This results in lowering the arm 94 slightly, so as to bring the cam roll 104 off the high part of its cam 108 and swinging the brush from the position shown in Figs. 4 and 16 to that shown in Figs. 5 and 17 so as to bring the web and the surface of the roll B into contact. The continued motion of the two cams between the lines $b$ and $c$ causes no change in the position of the brush so that the brush will be sure to press the web against the pasted edge of the web roll B and that pasted edge will travel well into the feeding mechanism of the press. This brush is designed to yield to the irregularities of the web roll and insure the pasting of the web all the way across.

When the cams have rotated to the point marked $c$, Fig. 11, the cutting off of the expiring web takes place (Fig. 6). The spaces between the ends of the insulating ring 34 on the collector 35 permits the brush 43 to contact with the metallic surface of the collector and the current to flow from the generator 45 through the brush 48, collector ring 49, and dotted line circuit to energize the solenoid 35. This operates the puncturing blade 57 from the position shown in full lines in Fig. 25 to that shown in dotted lines, so that it will start a cut in the edge of the paper. At the same time the operation of the bell crank 36 by the solenoid acts to disengage the latch 134 from the tooth 133 of the lever 131 pivoted on the arm of the reel carrying the expiring web roll. That weight 132 comes down and applies a brake to the spindle of that roll. By these two actions and the pressure of the brush 54 on the web, the latter is severed from the expiring web roll stub. After the severing blade 57 has operated, it is restored to its original position by the spring $39^a$ as stated. At this time the operator raises the handle 15 thus taking the propelling tapes off the roll and restoring the pawl 82 to the position shown in Fig. 9.

The continued rotation of the cam 88 from $c$ to $d$ brings the roller 91 out of the cam. This raises the arm 94 and restores the brushes to the original position as indicated in Fig. 7. When the point $d$ is reached the circuit is broken by the insulated section 23 on the collector ring 49 and the circuit cannot be re-established until the cam shaft is moved from the position $d$ to the position $a$ and the insulation 23 moved away from the brush 24 so the circuit breaker 26 can be energized. This rotation has to be performed by hand through the handle 15 as above stated. The breaking of the circuit at 23 also deenergizes the circuit breaker 33 and allows the switch 32 to be closed by the action of its spring thus starting the reel to rotate again to bring up a fresh roll C nearly to pasting position.

It will be seen, therefore, that the whole machine is operated at web speed when the splicing is being done, and is started merely by the depression of the operating handle 15 and the closing of the hand switch 31. The whole operation is performed while the web is moving at web speed and the operator does not have to perform any function at all in order to stop the machine, stop the reel, or to bring any or all of the parts to their normal running position ready for the next splicing operation. The action is not only automatic, but quick and accurate, and on account of the construction and operation of the parts they cannot be operated at the wrong time by any ordinary tampering with the machine.

In view of the number of operations the machine performs it is a comparatively simple machine in construction and operation.

Although I have illustrated and described only one form of the invention, I am aware of the fact that many modifications can be made therein by any person skilled in the art without departing from the scope of the invention as expressed in the claims. Therefore, I do not wish to be limited to the details of construction herein shown and described, but what I do claim is:—

1. In a web change device, the combination with means for supporting a running web roll and a fresh web roll having a pasted area thereon, of propelling means for rotating the fresh web roll on its own axis, means for moving said propelling means into position to drive said fresh roll, a deflecting device in contact with which the web runs and located on the side of the web opposite the web roll, and means co-operating with the propeller moving means for moving the deflecting device toward said web roll.

2. In a web change device, the combination with means for supporting a running web roll and a fresh web roll, of propelling means for rotating the fresh web roll on its own axis, means for moving the roll propelling means into operative and inoperative positions, a yielding surfaced deflecting device in contact with the web, means co-operating with said moving-means for moving the deflecting device into a position to come nearly into contact with the fresh web roll with the web between them, and means for then moving the roll support to bring the fresh roll into contact with the web.

3. In a web change machine, the combination with means for supporting a running roll and a fresh web roll, and means for rotating the fresh web roll on its axis, of a yielding surfaced deflecting device normally in contact with the web to guide it over its surface, means whereby when the fresh roll is started into rotation the deflecting device will also move to bring the web out of its normal path close to a point of tangency to the surface of the fresh web roll, and means for then moving the roll support to bring the fresh roll into contact with the web as guided by said deflector.

4. In a web change machine, the combination with means for guiding a web from a running web roll to the press, of a flexible surfaced deflecting device in position for engaging the web, means for rotating a new web roll on its own axis, feeding belts for controlling the rotation of the running web roll, means for moving the deflecting device in the space between the feeding belts and the adjacent side of the new roll to deflect the web toward the new roll, means for thereafter moving the deflecting device in another direction to a point nearer the fresh web roll, and means for moving the fresh web roll in the opposite direction at substantially the same time to bring the fresh web roll and the web into contact with each other for the pasting operation.

5. In a web change machine, the combination with means for guiding a web from a running web roll to the press, of a deflecting device in position for engaging the web, means for rotating a new web roll on its own axis, means for moving the deflecting device to deflect the web toward the new roll, means for thereafter moving the deflecting device in another direction to a point nearer the fresh web roll, and means for moving the fresh web roll in the opposite direction at substantially the same time to bring the fresh web roll and the web into contact with each other for the pasting operation.

6. In a web change device, the combination with means for supporting a running web roll and a fresh web roll and for moving them together intermittently, propelling means for turning the fresh web roll on its own axis, and feeding belts for turning the running web roll and controlling the speed of the web of a brush mounted in the angle between the feeding belts and the roll propelling means and extending across the fresh roll, and hand controlled means for moving the roll propelling means into contact with the fresh web roll and at the same time causing the brush to move further into the angle between the feeding belts and the surface of the fresh web roll.

7. In a web change machine, the combination with means for supporting a fresh web roll in a position adjacent to the running path of the web, a series of roll propelling means normally held away from the surface of the fresh web roll, and a brush for guiding the web normally held in a position away from the fresh web roll, of an operating handle movable to two positions, means connected with said operating handle for moving the roll propelling means into contact with the surface of the fresh web roll, means connected with said operating handle for moving the brush into a position adjacent to the side of the fresh web roll but out of contact therewith and means for thereafter moving the brush to force the web into contact with the fresh roll.

8. In a web change machine, the combination with means for supporting a fresh web roll in a position adjacent to the path of the web, of a series of propelling tapes, means for normally holding said tapes away from the surface of the fresh web roll, a brush for guiding the web, means for normally holding the brush away from the fresh web roll, feeding belts for engaging the running web roll and controlling its rotation, said brush being located in a position between said belts and the normal path of the web, an operating handle movable to two positions, means connected with said operating handle for operating both of said holding means to move the propelling tapes into contact with the fresh web roll and the brush toward the fresh web roll but out of contact therewith and means for thereafter moving the brush to force the web into contact with the fresh roll.

9. In a web change device, the combination with means for supporting a running web roll and a fresh web roll and for moving them together intermittently, of propelling means for turning the fresh web roll on its own axis, a brush for laying the web on the fresh web roll, means for moving the roll propelling means into contact with the fresh web roll and at the same time causing the brush to move toward the surface of the fresh web roll, and means whereby after the brush has been so moved, the brush will be swung further toward the fresh web roll while the fresh web roll is moving toward the brush to engage the web between the two.

10. In a web change device, the combination with means for supporting a running web roll and a fresh web roll and for moving them together intermittently, of propelling tapes for turning the fresh web roll on its own axis, a brush for laying the web on the fresh web roll, hand controlled means for moving the roll propelling tapes into contact with the fresh web roll and at the same time causing the brush to move toward the surface of the fresh web roll, a shaft adapted to be connected with the press to which the web is being fed, means for making that connection to rotate the shaft, and means whereby when the shaft starts to rotate, after the brush has been so moved, the brush will be swung further toward the fresh web roll while the fresh web roll is moving toward the brush to engage the web between the two and apply it to a pasted spot on the fresh web roll.

11. In a web change device, the combination with means for supporting a fresh web roll, and means for propelling it on its own axis, of a guide located at a distance from the fresh web roll and tangent to a larger circle, a slide on the guide, means connected with the web roll propelling means for moving the slide by hand along the guide toward the roll, a brush pivotally mounted on the slide adapted to extend along the whole length of the fresh web roll and to yield to irregularities of the surfaces thereof, power operated means for automatically moving the brush further along its guide toward the web roll, a stationary cam and a roll connected with said brush and movable with it along the cam and adapted to enter a depression in the cam to swing the brush about its pivot further toward the fresh web roll.

12. In a web change device, the combination with means for supporting a fresh web roll, of a guide located at a distance from the fresh web roll, a slide on the guide, means for moving the slide along the guide toward the roll, a brush pivotally mounted on the slide, power operated means for moving the brush further along its guide toward the web roll, a stationary cam, and a roll connected with said brush and movable with it along the cam and adapted to enter a depression in the cam to swing the brush about its pivot further toward the fresh web roll.

13. In a web change device, the combination with means for supporting a fresh web roll, of guides fixed adjacent thereto, slides movable along the guides, means to move the slides a certain distance along the guides, a stationary cam connected with each guide and having a depression, a roller connected with each slide movable into said depression, and a brush pivotally mounted on said slides for engaging and moving the web and having means for supporting the rollers to swing about its pivot when the rollers enter the depressions in the last named cams and move into a position to force the web against the fresh roll.

14. In a web change device, the combination with means for supporting a fresh web roll, of guides fixed adjacent thereto, slides movable along the guides, a cam shaft having cams thereon, levers having rolls movable in the grooves of said cams and connected with said slides, hand operated means for turning the crank shaft through a part of a revolution, said cam grooves being shaped to move the slides a certain distance along the guides by the motion of the cam shaft by hand, said cam grooves having depressions therein, whereby when moved beyond that point the slides will be moved farther, a stationary cam connected with each guide and having a depression, a roller connected with each slide movable into said last named depression, a brush pivotally mounted on said slides for engaging and moving the web and having means for supporting the rollers to swing about its pivot when the rollers enter the depressions in the last named cams and move into a position to force the web against the fresh roll, and spring pressed means for holding the rollers against the cam surface.

15. In a web change device, the combination with means for supporting a fresh web roll, of means for guiding the web from the running roll to the press, means for starting the fresh web into rotation on its own axis, a cam shaft connected with said starting means, to be rotated thereby through a definite arc, cams on said cam shaft, means operated by the rotation of said cams through said arc for deflecting the web out of its path toward the fresh web roll, means for connecting the cam shaft with a source of mechanical power and rotating it, said cams having means whereby when first moved by power the web will be deflected nearer to the fresh web roll and will thereafter be moved into contact with it, and means for automatically stopping the cam shaft in its original position after it has rotated far enough to restore the web deflecting means to its original position.

16. In a web change device, the combination with means for supporting a fresh web roll, of means for guiding the web from the running roll to the press, hand operated means for starting the fresh web into rotation on its own axis, a cam shaft connected with said hand operated starting means to be rotated thereby through a definite arc by the operation of the hand operated means, cams on said cam shaft, means operated by the rotation of said cams through said arc by said hand operating means for deflecting the web out of its path toward the fresh web roll, means controlled by the rotation of the fresh web roll about its own axis for connecting the cam shaft with a source of mechanical power and rotating it, said cams having means whereby when first moved by power the web will be deflected nearer to the fresh web roll ready to be engaged thereby and will thereafter be moved into contact with it, and means for automatically stopping the cam shaft in its original position after it has rotated far enough to restore the web deflecting means to its original position.

17. In a web change machine, the combination with means for supporting a fresh web roll in a position adjacent to the path of the web, and a brush for guiding the web normally held in a position away from the fresh web roll, of an operating handle movable to two positions, means connected with said operating handle for moving the brush into a position adjacent to the side of the fresh web roll but out of contact therewith, a cam shaft, cams thereon, and automatic means controlled by the position of the web roll around its own axis for connecting said cam shaft with a source of power, said cams having means for immediately swinging the brush further toward the fresh web roll when it is operated by power, and the cam grooves extending around in a position to restore the brush to its original position out of the way of the fresh web roll when the cam shaft makes a complete revolution from its starting point.

18. In a web change machine, the combination with means for supporting a fresh web roll, of a brush for guiding the web normally held in a position away from the fresh web roll, an operating handle movable to two positions, means connected with said operating handle for moving the brush into a position adjacent to the side of the fresh web roll but out of contact therewith, a cam shaft having cams thereon provided with cam grooves, means connected with said cams for controlling the position of the brush, the cams being located in such position that said means for operating the brush will rotate through an arc far enough to move the brush further toward the web roll, and means controlled by the position of the web roll around its own axis for connecting said cam shaft with a source of power, the cam grooves extending around in a position to restore the brush to its original position out of the way of the fresh web roll when the cam shaft makes a complete revolution from its starting point, the hand operated means constituting the only means for moving the cam shaft from the last named position through an arc in which the brush receives its first motion.

19. In a web change device, the combination with means for supporting a fresh web roll, means for rotating it on its own axis, and a deflecting means for the web running from the running roll to the press comprising a soft surfaced member adapted to yield at all points to the irregularities of the web roll, of means for moving the deflecting means by hand as far as it will go in a certain direction toward the fresh web roll, and power operated means controlled by the rotation of the fresh web roll for swinging the deflecting means about its axis thereafter further toward the fresh web roll.

20. In a web change device, the combination with means for supporting a fresh web roll, means for rotating it on its own axis, and a deflecting means for the web running from the running roll to the press, of means for moving the deflecting means in a direction toward the fresh web roll, and power operated means controlled by the rotation of the fresh web roll for swinging the deflecting means thereafter further toward the fresh web roll.

21. In a web deflecting device for a web change machine, the combination with means for supporting a running roll and a fresh roll of a deflector, means for moving the deflector to bring the web toward the splicing point on the fresh roll, and means for moving the deflector in another direction up to the splicing point.

22. In a web change device, the combination of a reel having arms projecting therefrom for supporting a plurality of web rolls, each free to rotate on its own axis and each having an end spindle or stud adapted to rotate with the roll, an arm on each of these studs, each web roll before it is connected with the web being supplied with a paste spot on its circumference at an angle in advance of the direction of said arm, a device for moving the web toward the fresh web roll, a switch in the path of each of said arms as it rotates on its own axis and adapted to be closed by the rotation of the arm when the roll is in web splicing position, a circuit connected with and adapted to be closed by said switch, a circuit breaker in said circuit, and a circuit adapted to be completed by said circuit breaker for controlling the operation of said web deflecting device.

23. In a web change device, the combination with a reel for supporting the web rolls, a device for deflecting the web from its normal path from the running roll toward the fresh web roll, a cam shaft having cams thereon provided with connections for controlling the action of the web deflecting device, a magnetic clutch for connecting the cam shaft with a source of power, a switch for controlling the clutch, means for closing the switch located in position to be operated by the rotation of the new web roll on its own axis to a position for pasting, and means whereby the closing of the switch will energize the clutch to start the cam shaft by power.

24. In a web change device, the combination with a reel for supporting the web rolls, an electric motor for rotating the reel, a web deflecting device, a shaft, means operated by said shaft for controlling the action of the web deflecting device, means for connecting the shaft with a source of power, a switch arranged in position to be engaged by the surface of a new web roll when it moves up to splicing position to close the switch, a switch in position to be closed by the rotation of the new web roll on its own axis, and means whereby the closing of the first named switch will open the motor circuit and stop the reel and the closing of the second switch will start the cam shaft to rotating by power.

25. In a web change device, the combination with a reel for supporting the web rolls, a motor for rotation the reel, a device for deflecting the web from its normal path toward the fresh web roll, a cam shaft having cams thereon provided with connections for controlling the action of the web deflecting device, a magnetic clutch for connecting the cam shaft with a source of power, a switch for controlling the supply of power to the motor adapted to be engaged by the surface of a new web roll when it moves up to splicing position to close the switch, a switch for controlling the supply of power to the clutch in position to be closed by the rotation of the new web roll on its own axis to a position for pasting, and means whereby the closing of the first named switch will open the motor circuit and stop the reel and the closing of the second switch will energize the clutch to start the cam shaft by power.

26. In a web change device, the combination with a reel for supporting the web rolls, a motor for rotating the reel, a web deflecting device, a cam shaft having cams thereon, means operated by said cams for controlling the action of the web deflecting device, a switch in position to be engaged by the surface of a new web roll when it moves up to splicing position and closed, a switch in position to be closed by the rotation of the new web roll on its own axis to a position for pasting, a clutch for the cam shaft, electric circuits connected with said switches and with the cam shaft motor and clutch, means in said circuits whereby the closing of the first named switch will open the motor circuit and stop the reel and the closing of the second switch while the first one is closed will close a circuit to the clutch to start the cam shaft by power, and means for stopping the shaft after part of a rotation in such position that it cannot be rotated further except by hand.

27. In a web change device, the combination with a reel for supporting the web rolls, a motor for rotating the reel having a circuit provided with means for opening it and stopping the reel, a cam shaft, means controlled by the cam shaft for splicing the web, a magnetic clutch for connecting the cam shaft with a source of power, a circuit connected with the clutch, and a switch in position to be closed by the rotation of a fresh web roll with the reel, said switch being connected for causing the closing of said circuit.

28. In a web change device, the combination with a reel for supporting the web rolls, a motor for rotating the reel having a circuit provided with means for opening it and stopping the reel, a cam shaft, means controlled by the cam shaft for splicing the web, a magnetic clutch for connecting the cam shaft with a source of power, a circuit connected with the clutch, a circuit breaker having means for closing said circuit, a switch in position to be closed by the rotation of a fresh web roll with the reel, said switch being connected with the circuit breaker for controlling its operation and causing the closing of said circuit when the switch is closed, and means whereby the closing of the circuit will also short-circuit the switch.

29. In a web change device, the combination with a support for the web rolls, a motor for moving the support, a switch adapted to be engaged by the surface of a new web roll when it moves up to splicing position to close the switch, electric circuits connected with said switch and with the motor, and means in said circuits whereby the closing of the switch will open the motor circuit and stop the support.

30. In a web change device, the combination with a reel for supporting the web rolls, a motor for rotating the reel having a circuit provided with means for opening it and stopping the reel, and means adapted to be engaged by a web roll moving with the reel for operating the circuit opening means.

31. In a web change device, the combination with means for bodily moving a fresh web roll, means operated by the web roll when it reaches splicing position for stopping said moving means, and means controlled by the rotation of the fresh web roll for deflecting the running web to a position to contact with the fresh web roll.

32. In a web change device, the combination with a reel for supporting a running web roll and a fresh web roll, of means comprising an electric motor for rotating the reel slowly, an electric switch having an arm in position to be engaged by the fresh web roll and closed as said roll moves to splicing position, a circuit adapted to be completed by the closing of said switch and having a circuit breaker therein, and a magnetic switch in the motor circuit arranged to be opened by said circuit breaker when the first named switch is closed, whereby the rotation of the reel will be stopped.

33. In a web change device, the combination with a rotatable reel for supporting a pasted fresh web roll, of a cam shaft, means operated by the fresh web roll for connecting the cam shaft automatically with a source of power when the web roll rotates to a certain position relative to its spots of paste used for splicing, cams on the cam shaft having means for moving the web into contact with the fresh web roll immediately after it has started, a knife for puncturing the edge of the old web near the exhausted web roll stub, a solenoid located in position adjacent to the position of the exhausted web roll, an electric circuit adapted to energize the solenoid when the cam shaft reaches the point in its rotation at which it has moved the web into contact with the fresh web roll, and means controlled by said solenoid for operating said puncturing device.

34. In a web change device, the combination with a rotatable reel for supporting a pasted fresh web roll, means for moving the web into contact with the fresh web roll, a knife for puncturing the edge of the old web near the exhausted web roll stub, a solenoid located in position adjacent to the position of the exhausted web roll, an electric circuit adapted to energize the solenoid when the web has moved into contact with the fresh web roll, and means controlled by said solenoid for operating said puncturing device.

35. In a web change device, the combination with means for supporting a running roll and a fresh web roll and moving them along a path, of means for engaging the web and forcing it into intimate contact with the surface of the new roll throughout the width of the web, means for puncturing the edge of the old web after the splicing operation is performed, and means for simultaneously applying a brake to the stub of the old web roll, whereby the web will be severed by the coaction of the three last named means.

36. In a web change device, the combination with means for supporting a running roll and a fresh web roll and moving them in a path, of means for puncturing the edge of the old web after the splicing operation is performed, and means for simultaneously applying a brake to the stub of the old web roll, whereby the web will be severed.

37. In a web change device, the combination with a rotatable reel for supporting the web rolls, a knife for puncturing the edge of the old web near the exhausted web roll stub, means for operating said puncturing knife, a brake on each of the web roll shafts, and means for applying the brake on the exhausted web roll stub to stop the rotation of the stub and cooperating with the knife to complete the operation of separating the stub from the end of the web after the splicing operation is completed.

38. In a web change device, the combination with a reel rotatable on an axis and adapted to support a plurality of web rolls, each web roll having a stud provided with a brake disc thereon with which stud the roll is adapted to rotate concentrically, a brake-band on each brake disc, a pivoted weight connected with one end of each brake-band for applying it when the reel rotates around to bring the weight in proper position for exerting its pressure in one direction, a latch pivoted adjacent to each of the web roll spindles for holding the weight in inoperative position until released, a solenoid mounted in stationary position, means for automatically energizing the solenoid when the reel reaches a predetermined position, a web severing device, and a lever connected with the web severing device and with the solenoid for operating the severing device, said lever having an arm for operating said latch at the same time.

39. In a web change device, the combination with a reel rotatable on an axis and adapted to support a plurality of web rolls, each rotatable on its own axis, each web roll having a stud provided with a brake disc thereon, a brake-band on each brake disc, a pivoted weight connected with one end of each brake-band for applying it when the reel rotates around to bring the weight in proper position for exerting its pressure in one direction, a latch pivoted adjacent to each of the web roll spindles for holding the weight in inoperative position until released, and means for releasing said latch as the reel travels around and reaches a predetermined point in its rotation, whereby when that particular weight will be released and the brake will be applied to that web roll.

40. In a web change device, the combination with a reel rotatable on an axis and adapted to support a plurality of web rolls, rotatable on their own axes, each web roll having a stud provided with a brake disc thereon, a brake-band on each brake-disc, a pivoted weight connected with one end of each brake-band for applying it when the reel rotates around to bring the weight in proper position for exerting its pressure in one direction, a latch pivoted adjacent to each of the web roll spindles for holding the weight in inoperative position until released, a solenoid mounted in stationary position, means for automatically energizing the solenoid when the reel reaches a predetermined position, and a bell-crank connected with the solenoid and having an arm for engaging the said arm of the latch and operating it to release the weight and apply that brake.

41. In a web change device, the combination with a reel rotatable on an axis and adapted to support a plurality of web rolls, rotatable on their own axes, each web roll having a stud provided with a brake disc thereon, a brake-band on each brake disc, and means for automatically applying the brake to each web roll as it moves on beyond the normal running position.

42. In a web change device, the combination with a fresh roll, a running roll, means for causing the running web roll to rotate on its axis, a spindle for each of said rolls, means for cutting the edge of the web near one end of its spindle, and means for holding the running web roll at the same time to separate the web from the expiring roll.

43. In a web replenishing device, the combination with means for supporting a fresh web roll, of a member for applying the expiring web to the fresh web, said member having a surface adapted to conform to the irregularities of the fresh web roll and means for moving said member in a direction substantially tangential to a fresh web roll to apply the web to it.

44. In a web change machine, the combination with means for supporting a running web roll and a fresh web roll, and means for rotating the fresh web roll on its axis, of a yielding surfaced deflecting device normally in contact with the web to guide it over its surface, a rotary element, means connected to the rotary element to be operated thereby for actuating said rotating means to drive the fresh web roll and means connected to said rotary element to be operated thereby for simultaneously moving the deflecting device toward the fresh web roll to bring the web out of its normal path close to a point of tangency to the surface thereof.

In testimony whereof I have hereunto affixed my signature.

HENRY A. WISE WOOD.